June 6, 1961 W. BRANDL 2,987,605
HEATER FOR LIQUID AND GASEOUS MEDIA
Filed Sept. 25, 1959
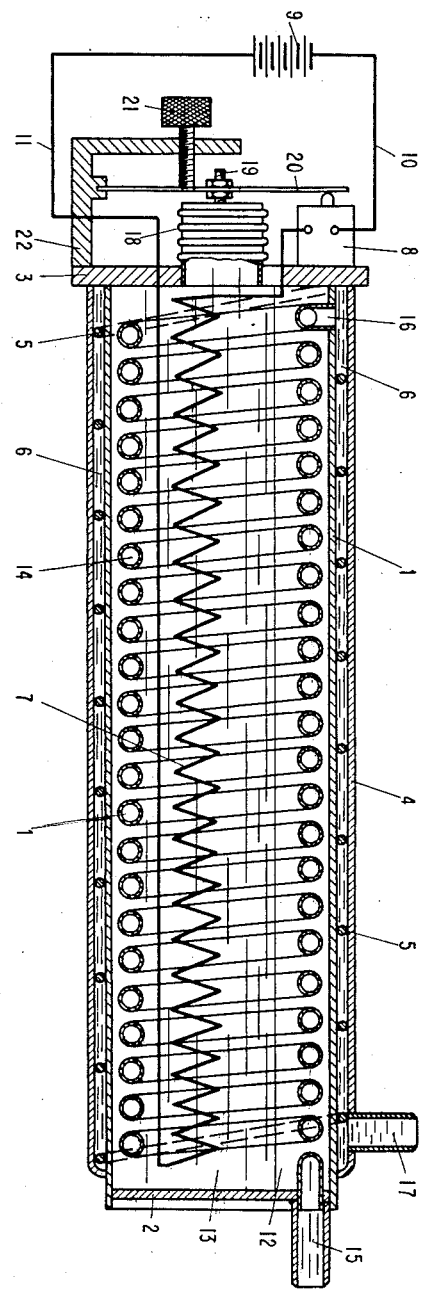

2,987,605
HEATER FOR LIQUID AND GASEOUS MEDIA
Wilhelm Brandl, 12 Schurbungert, Zurich, Switzerland
Filed Sept. 25, 1959, Ser. No. 842,233
Claims priority, application Switzerland Sept. 26, 1958
1 Claim. (Cl. 219—39)

The present invention relates to a heater for liquid and gaseous media, particularly oils and more particularly heavy fuel oils for the burners of heating plants.

It is a principal object of the invention to provide a heater of the kind referred to which permits a uniform heating of the medium and prevents local over-heating of a badly heat-conductive medium such as fuel oil and consequent coking thereof. These objects are of particular importance to heaters for the fuel oil of heating plants where the output of the burners depends on the viscosity and hence on the temperature of the fuel oil supplied to the burners of the plant.

With these and other objects in view which will become apparent later from this specification and the accompanying drawing, I provide a heater for liquid and gaseous media, comprising in combination: an evacuated vessel having an outer shell and partly filled with a liquid, a source of heat arranged inside the said vessel, a control element responsive to the pressure prevailing within the said vessel mounted on the said vessel and operatively controlling the supply of energy to the said source of heat, a pipe line passing through said vessel through which the medium to be heated flows in operation for being preheated before being further heated on the said outer shell of the vessel.

Preferably the said shell is of double-walled construction, the said medium, after being preheated, flowing through the space between the double walls. Baffles are conveniently arranged between the double walls to positively guide the flow of the medium to be heated. These baffles are conveniently made in the form of a wire helically wound in the said space betwen the double walls.

These and other features of my said invention will be clearly understood from the following description of a preferred embodiment thereof given by way of example with reference to the accompanying drawing, in which the single figure shows in longitudinal section a heater for the heavy fuel oil to be supplied to the oil burners of a central heating plant.

The heater consists of a vessel having a cylindrical shell 1, the end faces of which are closed in a gas-tight manner by bottoms 2 and 3. Around the shell 1 a second shell 4 is arranged at a spacing, and in the intervening space 6 a helically wound wire 9 is inserted as a baffle. The interior 12 of the vessel is evacuated and partly filled with water 13. In the interior an electrical heating element 7 is arranged which is connected to a source of current through a switch 8 and leads 10 and 11. Moreover the interior contains a pipe coil 14, which is in communication with a supply line 15 passing through the bottom 2 and with a discharge port 16 issuing into the space 6 between the shells of the casing. In the outer shell 4 there is moreover arranged a discharge socket 17, which communicates with the space 6 between the shells.

On the bottom 3 a temperature control device (known in itself) is mounted which is illustrated diagrammatically only, since it does not form part of the invention as such. It comprises a resilient bellows 18 the interior of which is in communication with the interior of the heater vessel. The bellows 18 acts through a screw 19 on a leaf spring 20, which at one end is clamped in a holder 22 and which at its other end acts on the switch 8, which is likewise arranged on the bottom 3. A control screw 21 allows the pre-stressing of the leaf spring 20 against the switch 8.

The manner of functioning of the heater is as follows: The switch 8 is normally closed. When a current flows from the source of current 9 through the heating element 7, the latter heats the water 13 which at once evaporates in the evacuated space and heats the walls of the vessel. The temperature is a function of the pressure in the interior 12 of the vessel. This pressure causes a resilient expansion of the bellows 18. The latter bears through the screw 19 on the leaf spring 20 and lifts the same off the switch 8 when its pre-stressing is overridden. Thereby the heating current is interrupted, and is switched on again only when the pressure has fallen below a predetermined value, and accordingly at a predetermined temperature. The pre-stressing of the spring 20 and accordingly the temperature of the heater can be adjusted by turning the screw 21.

The oil to be heated is fed by a pump (not shown) through the inlet socket 15 into the pipe coil 14 wherein it is preheated. It leaves the latter through the port 16 and flows into the space between the shells. It flows through the latter between the baffles 5 on a helical path until it reaches the outlet 17 and is passed to the oil burner. The large heated surface of the shell 1 allows a quite uniform heating of the comparatively thin oil layer in the space 6 between the shells. Local overheating of the oil which could lead to coking is prevented with safety by this design of the heater.

Instead of the bellows 18 a simple resilient diaphragm could be used, and for the heating of the water 13 hot gases or the like could be used instead of electricity.

While I have described herein and illustrated in the accompanying drawing what may be considered a typical and particularly useful embodiment of my said invention, I wish it to be understood that I do not limit myself to the particular details and dimensions described and illustrated; for obvious modifications will occur to a person skilled in the art.

What I claim as my invention and desire to secure by Letters Patent, is:

A continuous heating apparatus for flowing liquids, as oils, said apparatus comprising a double-walled, hermetically sealed, evacuated vessel, a body of a liquid which evaporates when heated partly filling said vessel, an electric heating element within said vessel for heating said liquid, a switch for closing the circuit through said heating element, a control unit subject to the pressure within said vessel for opening said switch at a predetermined pressure within said vessel, and means for adjusting said control means for operation at a desired pressure within said vessel, in combination with a spiral pipe within said vessel for contact with the heated evaporated liquid therein, an intake fitting in a wall of said vessel connected to one end of said spiral tube, for flowing liquid to be heated in the apparatus, a connection for the opposite end of said spiral pipe extending through the inner wall of said vessel into the space between the double walls thereof, and an outlet fitting extending through the outer wall of said vessel for flow of the heated liquid out of the apparatus, whereby liquid to be heated flows through the spiral pipe within said vessel and is heated by the heated evaporated liquid in said vessel, flows from said pipe into the space between the double walls of said vessel to be further heated and flows thence through said outlet fitting out of the apparatus, said switch and said control unit maintaining the temperature within said vessel at a predetermined value set by said adjusting means.

References Cited in the file of this patent

UNITED STATES PATENTS 1,926,958 Peterson _____ Sept. 12, 1933
1,951,403 Goddard _____ Mar. 20, 1934
2,868,178 Peters _____ Jan. 13, 1959

FOREIGN PATENTS 727,225 Great Britain _____ Mar. 30, 1950